United States Patent Office 3,555,658
Patented Jan. 19, 1971

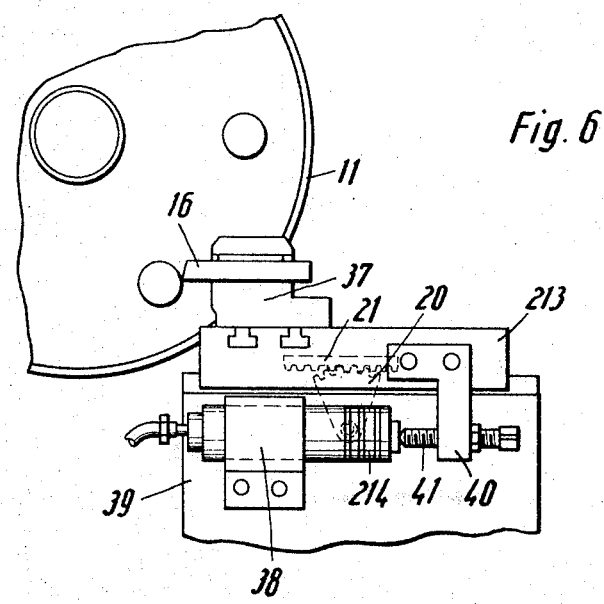
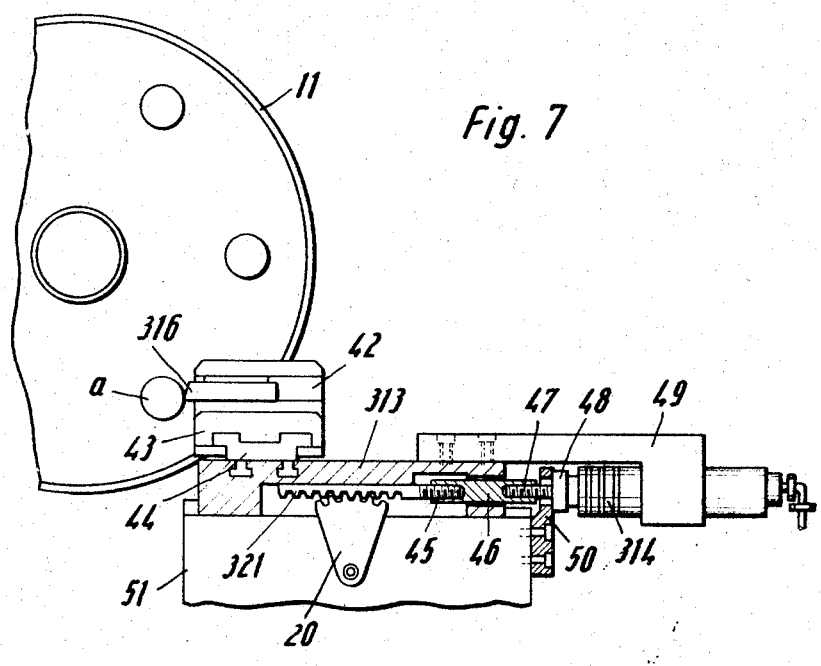

3,555,658
METHOD AND APPARATUS FOR MONITORING AND REDUCING TOLERANCES OF WORKPIECES IN MULTIPLE-SPINDLE MACHINE TOOLS
Hans-Gerold Möbius, Bielefeld, Karl-Wilhelm Kuckelsberg, Babenhausen, and Klaus Lange, Brockhagen, Germany, assignors to Werkzeugmaschinenfabrik Gildemeister & Comp. Akt.-Ges., Bielefeld, Germany
Filed Feb. 23, 1968, Ser. No. 707,855
Claims priority, application Germany, Mar. 2, 1967,
W 43,470
Int. Cl. B23q 17/00
U.S. Cl. 29—407
17 Claims

ABSTRACT OF THE DISCLOSURE

A multiple spindle machine tool wherein a cross slide at one of several working stations carries an adjustable tool which is adjusted in automatic response to signals produced by a monitoring device provided at another station to determine the tolerances of successive workpieces and to produce signals when the tolerance of a workpiece deviates from a desired tolerance. Signals are stored and are utilized to adjust the tool when a spindle which carried a defective workpiece during the preceding cycle places a fresh workpiece into registry with the adjustable tool during the next-following cycle.

BACKGROUND OF THE INVENTION

The present invention relates to multiple-spindle bar or chucking machines, and more particularly to a method and apparatus for reducing tolerances held by multiple-spindle machine tools in the type wherein the workpieces are transported in indexible work spindles past a plurality of stations and are treated by one or more adjustable tools installed at least at one of the stations.

In conventional multiple-spindle machine tools, inaccuracies in the positioning of work spindles, wear on tools, overheating, inaccurate mounting of tools in their holders and/or other factors influence the accuracy of machining operations at various stations. Such inaccuracies can develop irrespective of whether the tools are mounted on cross slides or on the main tool slide. Additional deviations from desired tolerances are frequently due to differences in hardness and/or other properties of successively treated workpieces as well as to the presence of pickups on the cutting edges of tools. Deviations between actual and desired tolerances are normally detected by spot checking, and the tools are thereupon adjusted in order to eliminate such deviations. Spot checking is unsatisfactory because it does not result in detection of all faulty workpieces; it also consumes too much time and is unreliable unless carried out by highly skilled operators.

If a defect remains undetected for extended periods of time, an entire batch of workpieces must be discarded with resultant loss in output and material.

It is already known to measure successively treated workpieces in a single-spindle machine and to adjust the tool or tools in automatic response to signals produced as a result of measurements. However, such procedure is not applicable in multiple-spindle machines wherein the workpieces are carried by a succession of work spindles and wherein deviations between actual and desired tolerances are frequently due to inaccuracies in dimensioning and/or positioning of work spindles.

SUMMARY OF THE INVENTION

It is an important object of our invention to provide a method of reducing tolerances held by the multiple-spindle machines regardless of whether excessive tolerances are due to defective mounting of or wear on the tools or to inaccuracies in positioning and/or dimensioning of work spindles.

Another object of the invention is to provide a method according to which deviations between actual and desired tolerances in the finish and/or dimensioning of workpieces are eliminated automatically and without delay so that the machine cannot turn out a large batch of defective products.

A further object of the invention is to provide a multiple-spindle bar or chucking machine wherein each and every workpiece is tested for the presence or absence of defects in its dimensions and/or finish and wherein any such tools which might have caused deviations between actual and desired tolerances can be adjusted automatically prior to engagement with fresh workpieces in those spindles which carried improperly treated workpieces during the preceding cycle.

An additional object of the invention is to provide a multiple-spindle machine wherein tools mounted on cross slides can treat successive workpieces with an accuracy which cannot be matched by tools in conventional machines.

The method of our invention comprises the steps of transporting a series of workpieces in a succession of work spindles past a plurality of stations, treating successive workpieces by adjustable tool means at a first station, determining the tolerances of the thus treated workpieces at a second station located past the first station, comparing the thus determined tolerances with a desired tolerance and producing for each spindle a signal whose magnitude and/or intensity is indicative of deviations between the desired tolerance and the determined tolerance of the workpiece carried by the respective spindle, storing the signals, replacing the workpieces with fresh workpieces at a third station located past the second station but ahead of the first station, and utilizing the stored signals for adjusting the tool means at the first station not later than when the respective spindles with fresh workpieces therein return to the first station so that the fresh workpieces are treated to a closer tolerance than the workpieces previously held by the respective spindles whenever the comparing step reveals a deviation between the desired tolerance and the determined (actual) tolerance. Thus, at the very worst, the machine can turn out a small batch or series of defective workpieces, i.e., a batch wherein the number of workpieces at most equals the number of work spindles. However, a defective workpiece which was transported by a given spindle is immediately followed by a satisfactory workpiece (transported by the same spindle) because the tool means is adjusted automatically before (or not later than at the time when) such spindle (with a fresh workpiece therein) returns to the first station.

The step of utilizing stored signals for adjustment of tool means at the first station may be carried out in synchronism with indexing of the spindles, and the second station may but need not immediately follow the first station. For example, and if the machine comprises six spindles, finished workpieces may be withdrawn from and fresh workpieces fed to successive spindles at one at the same station, and each of the remaining five stations may accommodate a cross slide with adjustable tool means each of which can subject the workpieces to a different treatment. Such a machine may be provided with as many as five measuring or monitoring devices which determine the dimensions or finish of successive workpieces and each of which can produce signals for adjustment of tool means on one of the cross slides. If some of the tool means are used to effect coarse or preliminary treatment of selected portions of successive workpieces, and if only one of the tool means subjects such selected portions of workpieces to a final treatment, a single measuring device might suffice to determine the tolerance of selected portions of workpieces at a station located downstream of the one which accommodates the finishing tool or tools.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 6 is a similar view of a cross slide which can accept standard tool holders; and FIG. 7 is a similar view of a further cross slide which supports a carriage for a turning tool.

DESCRIPTION OF THE PREFERRED EMBODIMENTS

Figure 1:
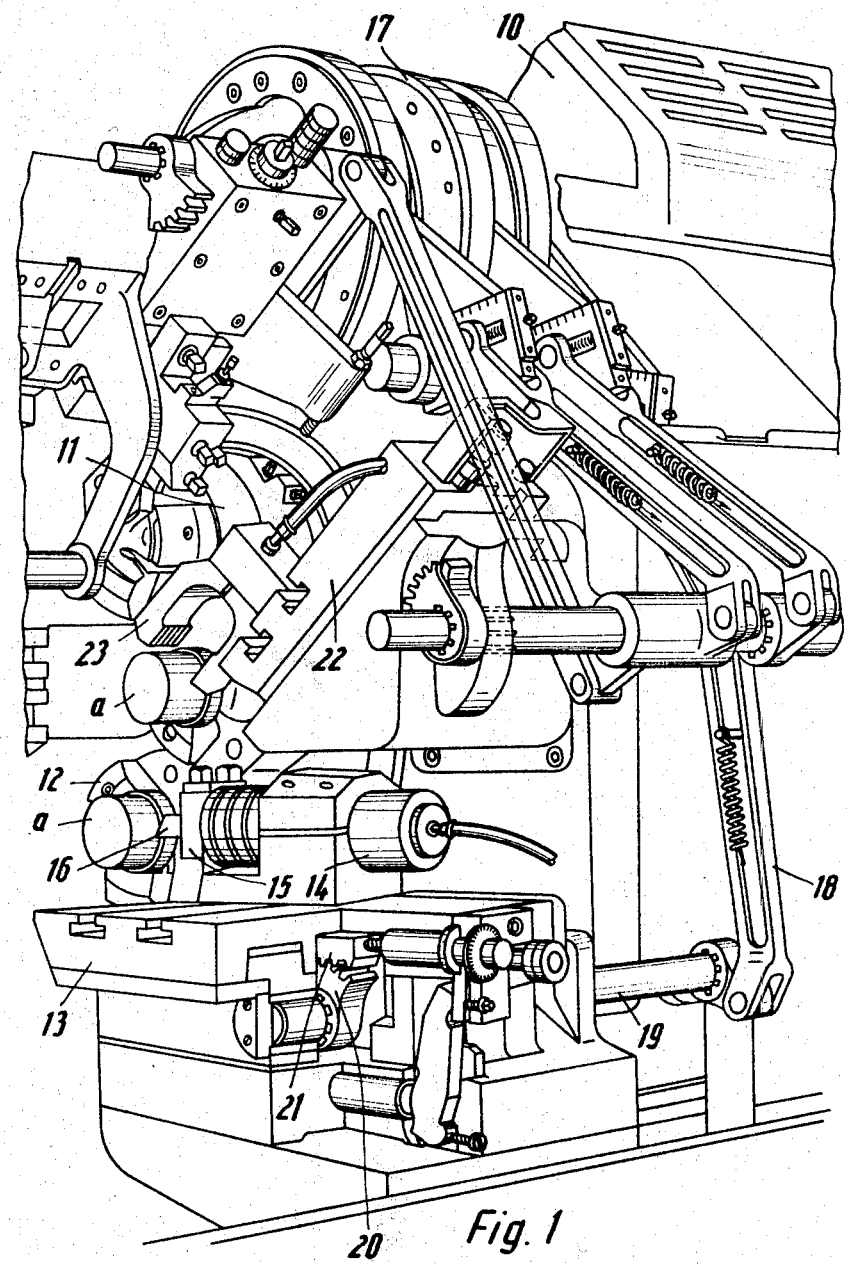
FIG. 1 is a fragmentary perspective view of a multiple-spindle chucking machine or bar machine with six spindles which embodies our invention.
Figure 2:
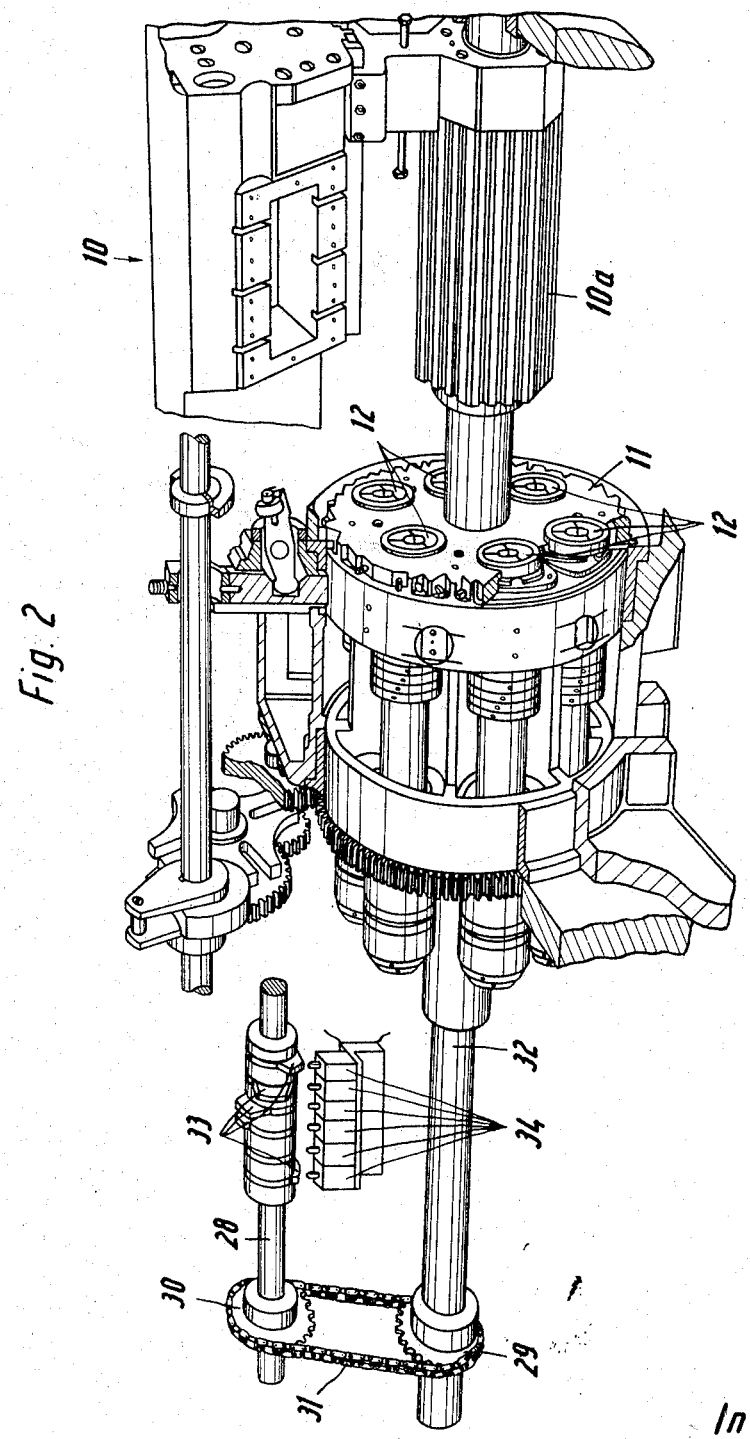
FIG. 2 is a perspective view of the spindle carrier and of certain other parts in the machine of FIG. 1.

FIGS. 1 and 2 illustrate a portion of a multiple-spindle chucking machine or bar machine which comprises a frame 10 supporting a carrier or turret 11 indexible about a horizontal axis and carrying six equidistant work spindles 12. A main tool slide is shown at 10a. The carrier 11 is indexed intermittently to advance the spindles 12 past six stations I to VI (see FIG. 3) each of which accommodates or can accommodate a cross slide. The cross slide 13 at the station II supports a tool 16 (e.g., a bit) which is mounted in a holder 15, and the latter is adjustable with reference to the cross slide 13 by a pneumatic or hydraulic adjusting device 14. The cross slides are cammed individually or two or more thereof may operate off a single cam. FIG. 1 shows that the feed for moving the cross slide 13 comprises a rotary cylindrical cam 17 and a power train including a linkage 18, a shaft 19 turnable by the linkage 18, a toothed gear segment 20 on the shaft 19, and a toothed rack 21 meshing with the gear segment 20 and affixed to the slide 13. At the end of its forward stroke, the cross slide 13 strikes against a suitable stop 13b (FIG. 4) which determines the extent to which the cutting edge of the tool 16 can penetrate into a workpiece a held by that spindle 12 which dwells at the station II. The extent of such penetration can be regulated by the adjusting device 14 which serves to adjust the tool holder 15 and the tool 16 with reference to the cross slide 13.

The station I accommodates a second cross slide 22 which carries a pneumatically operated measuring or monitoring device 23 serving to determine the tolerance of the worpiece a which was treated at the station II by engagement with the cutting edge of the tool 16. The mechanical feed for the cross slide 22 moves the measuring device 23 into engagement with the worpiece a when the latter reaches the station I, and the thus determined tolerance of the workpiece is compared with a desired tolerance. The device 23 produces signals which are indicative of the dimensions of successive workpieces, and such signals are modified prior to being transmitted to the adjusting device 14 which adjusts the tool holder 15 and tool 16 not later than at the time when the respective spindles 12 return to the station II. One form of control means for producing, receiving, modifying and storing such signals and for transmitting the modified signals to the adjusting device 14 is illustrated in FIG. 3.

Figure 3:
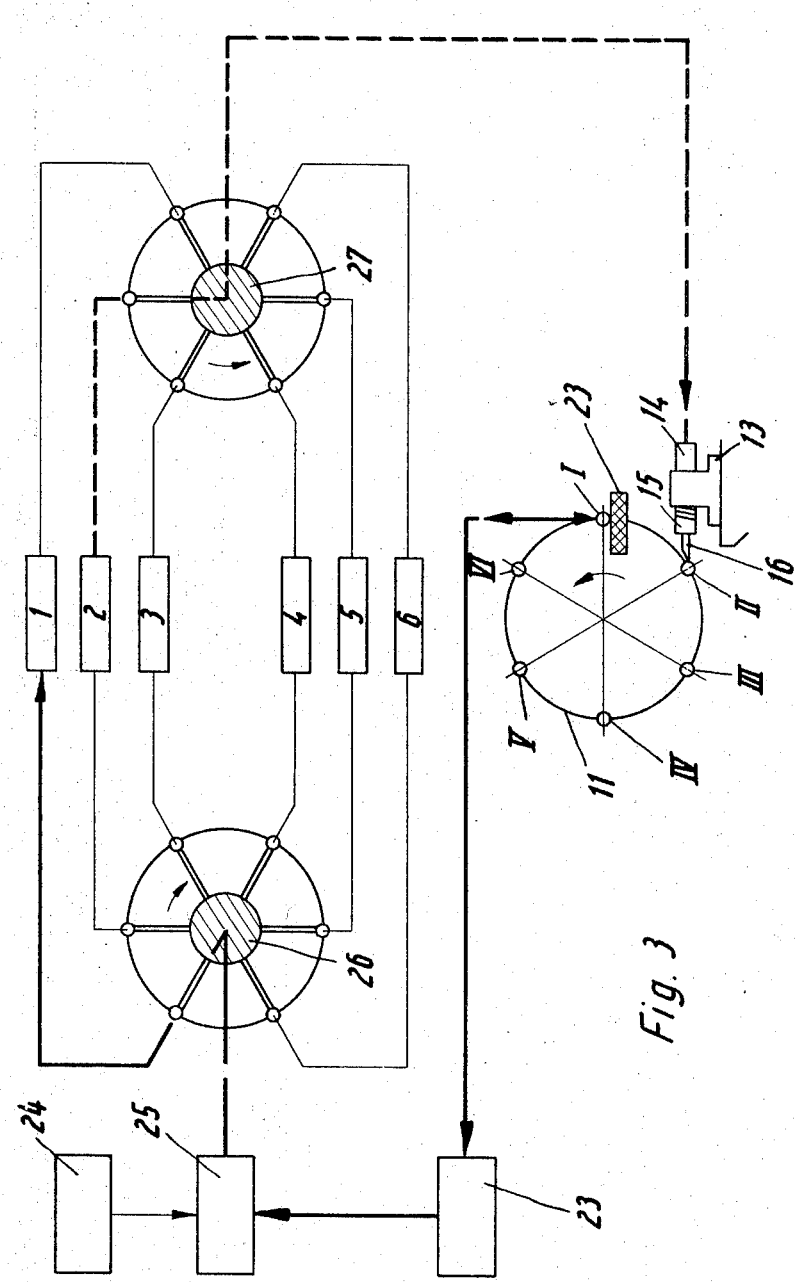
FIG. 3 is a diagrammatic view of the machine, showing the control system which adjusts the tool at one of the stations in the machine of FIG. 1.

FIG. 3 shows that the measuring device 23 which forms part of the control means transmits signals to a comparing or modifying unit 25 which also receives signals from an adjustable rated value setting device 24. Signals furnished by the measuring device 23 indicate the tolerances (actual dimensions) of successive workpieces a. The device 24 transmits signals which indicate the desired tolerance. The two signals are compared in the unit 25, and the output of this unit transmits modified signals whose magnitude or intensity is indicative of differences between the desired (rated) tolerance and the determined (actual) tolerances of successive workpieces. The output of the comparing unit 25 is connected with a first signal transmitting device 26 which transmits signals to six signal storing units 1 to 6, one for each of the spindles 12. The storing units 1 to 6 can transmit stored signals to a second signal transmitting device 27 which transmits signals to the adjusting device 14 at the station II. The operation of signal transmitting devices 26, 27 is synchronized with indexing movements of the carrier 11 in such a way that signals stored in a given storing unit are transmitted to the adjusting device 14 only when the corresponding spindle 12 reaches the station II. In other words, the unit 1 can receive a signal when a certain spindle 12 dwells at the station I, and the unit 1 transmits a signal to the adjusting device 14 when the same spindle 12 (but with a fresh workpiece therein) reaches the station II. Each of the signal transmitting devices 26, 27 may comprise a pneumatic rotary slide valve and such valves preferably flank the storing units 1 to 6.

In actual practice of our invention, the signal transmitting devices 26, 27 are preferably connected with a suitable logical circuit whose operation is analogous to that of the comparing unit 25. The logical circuit can carry out computations based on the concept of either-or, neither-nor, etc.

If the function of the tool 16 is to form in the peripheral surface of each workpiece a an annular groove of predetermined depth, the measuring device 23 can be employed to determine the depth of such grooves or the diameters of bottom surfaces in the grooves. The measurement can be carried out in accordance with a conventional pressure differential procedure and the device 23 can transmit to the comparing unit 25 pressure impulses whose magnitude or duration is indicative of the determined diameter of the bottom surface in the groove formed by the tool 16. The rated value setting device 24 then also transmits pressure impulses whose magnitude or duration is constant and is indicative of the desired diameter of the bottom surface in the groove of a freshly treated workpiece a. The signal transmitting devices 26, 27 are fixed to a common shaft 28 (see FIG. 2) which is parallel to the indexing shaft 32 for the carrier 11. In the angular position shown in FIG. 3, the output of the signal transmitting device 26 is connected with the signal storing unit 1, i.e., with the storing unit for that spindle 12 which dwells at the station I. The shaft 28 is rotated by the indexing shaft 32 at a rate of one-to-one by a transmission including two sprocket wheels 29, 30 and an endless link chain 31, all shown in the left-hand portion of FIG. 2. Thus, the angular movement of signal transmitting devices 26, 27 are synchronized with indexing movements of the carrier 11 and work spindles 12.

When the carrier 11 is indexed in a counterclockwise direction, as viewed in FIG. 3, to locate the next-following spindle 12 at the station I, the device 23 measure the next workpiece a (i.e., that workpiece which was treated at the station II) and the comparing unit 25 sends a corresponding signal to the device 26 which transmits the signal to the storing unit 2 wherein such signal remains until the spindle 12 which dwells at the station I returns to the station II with a fresh workpiece. At the same time, a signal stored in the unit 3 is transmitted by device 27 to the adjusting device 14 to effect requisite adjustment in the position of the holder 15 and tool 16.

It is clear that the measuring device 23 need not be located at the station (I) which immediately follows the station (II) for the adjustable tool 16. Finished workpieces can be replaced with fresh workpieces at the station IV, i.e., at a station located between the stations I and II as considered in the direction of the movement of workpieces away from the measuring device 23.

Inaccuracies in the dimensions and/or mutual spacing of spindles 12 can be compensated for by storing in the units 1–6 initial impulse whose magnitude is proportional to deviations of spindle measurements and/or spacing from a desired value. Adjustments carried out by the device 14 upon the position of the holder 15 can account for wear on the tool 16, for differences in hardness of successive workpieces a, for overheating of the machine and for inaccuracies in the dimensioning and/or spacing of spindles 12 (if such factors are not considered in the manner outlined above).

If the control system employs a logical circuit, the shaft 28 (FIG. 2) carries a set of six actuating cams or trips 33, one for each of the spindles 12. The angular spacing of actuating cams 33 is such that only one of these cams actuates the associated switch 34. The switches 34 convey signals to two signal transmitting devices which are analogous to the pneumatic devices 26, 27.

Figure 4:
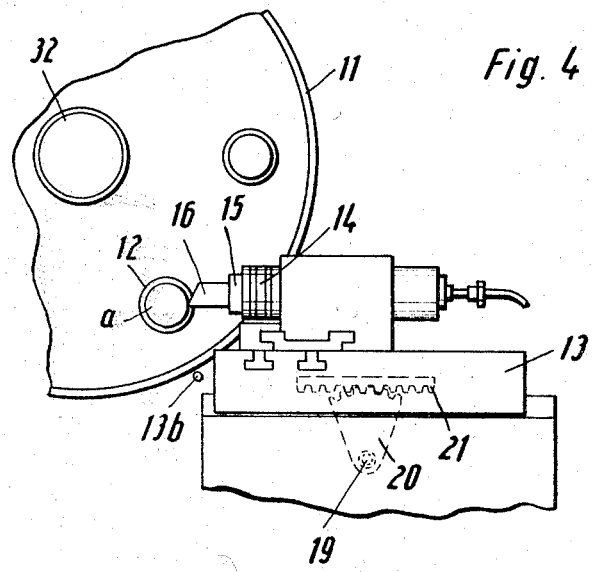
FIG. 4 is a front elevational view of the cross slide at one of the stations in the machine of FIG. 1.

FIG. 4 shows that the holder 15 for the tool 16 is directly coupled to the movable portion of the adjusting device 14. The stop for the cross slide 13 is shown at 13b. The adjusting device 14 includes a double-acting cylinder which is rigidly mounted on the cross slide 13 and a movable piston which is reciprocable in the cylinder and is connected with the tool holder 15. The accuracy of adjustments with the structure shown in FIG. 4 depends on the stability of the adjusting device 14. When the tool 16 meets a considerable resistance to penetration into the material of the workpiece a, the adjusting device 14 might vibrate and might affect the accuracy of the finish.

Figure 5:
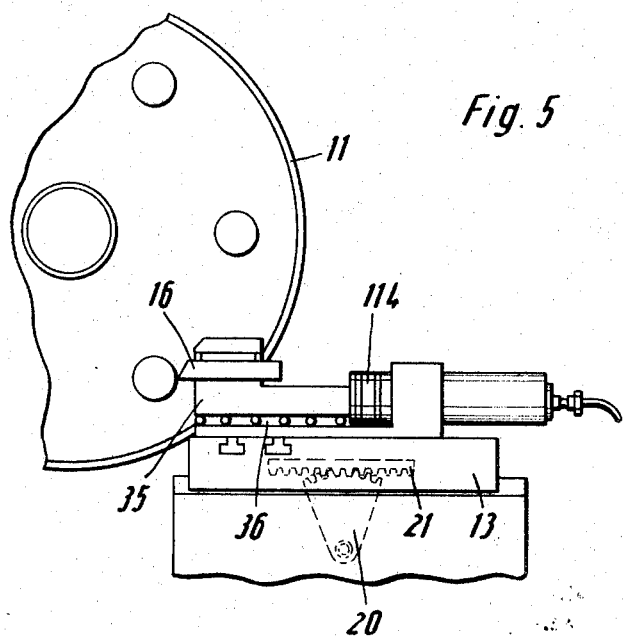
FIG. 5 is a similar view of a cross slide for a different tool holder.

FIG. 5 illustrates a modified pneumatic adjusting device 114 whose cylinder is counted on the cross slide 13 and whose piston transmits motion to the tool 16 by way of a tool holder 35 which is mounted on a layer of ball bearings or roller bearings 36 provided on the cross slide. The accuracy of the structure shown in FIG. 5 is higher than of that shown in FIG. 4 because the tool holder 35 is supported by the adjusting device 114 and by the cross slide 13.

FIG. 6 illustrates a modification of the structure shown in FIGS. 4 and 5. In this embodiment of our invention, the cross slide 213 can support a commercially available standard tool holder 37 which carries a tool 16. The cross slide 213 is movable by way of a toothed gear segment 20 which meshes with a rack 21 on the cross slide. The adjusting device 214 is mounted in a supporting bracket 38 which is rigidly secured to the fixed base 39 for the cross slide 213. The latter is rigid with a stop 40 which meshes with a regulating screw 41. In this embodiment of our invention, the stop 13b of FIG. 4 is replaced by the adjusting device 214, i.e., the cross slide 213 comes to a halt in its foremost position when the tip of the regulating screw 41 abuts against the reciprocable portion of the adjusting device 214. Such reciprocable portion (e.g., the piston or the piston rod of the adjusting device) changes its position in response to signals received from the signal transmitting device 27. Coarse adjustments which exceed fine adjustments that can be carried out by the device 214 are effected by changing the axial position of the regulating screw 41. This screw constitutes an adjustable abutment on the cross slide 213 adapted to engage the movable portion of the device 214.

FIG. 7 shows a cross slide 313 which supports a turning carriage 42 for a turning tool 316. The lower portion 43 of the carriage 42 is movable transversely of the cross slide 313 along ways 44 so that the tool 316 can treat elongated cylindrical portions of workpieces a by moving in parallelism with the axes of the respective spindles 12. The cross slide 313 is rapidly fed to its foremost position and the carriage 42 is thereupon fed axially of the workpiece a to complete the turning operation while the cross slide remains at a standstill. The foremost position of the cross slide 313 determines the diameter of the treated portion of the workpiece. The feed for the cross slide 313 comprises a rack 321 which meshes with an oscillatable toothed gear segment 20. The rack 321 is not rigid with the cross slide 313; it is connected with the reciprocable portion of the adjusting device 314. The righthand end portion of the rack 321 is rigid with a bolt 45 provided with right-hand threads meshing with complementary threads in the left-hand portion of an internally threaded regulating sleeve 46. The right-hand portion of the sleeve 46 is provided with internal threads which mesh with left-hand threads on a second bolt 47 having a collar 48 and rigidly affixed to the reciprocable portion of the adjusting device 314. The latter's cylinder is rigidly secured to a supporting bracket 49 which is bolted to the cross slide 313. The stroke of the cross slide 313 is limited by a stationary stop 50 on the fixed base 51 for the cross slide. When the cross slide reaches its foremost position, the collar 48 abuts against the stop 50. The position of the rack 321 with reference to the cross slide 313 can be changed independently of the movable portion of the adjusting device 314 to effect greater or lesser penetration of the tool 316 into the material of the workpiece a at the station II because the sleeve 46 can be turned to effect coarse adjustments in the position of the rack 321, i.e., such adjustments which are without the range of adjustments carried out by the device 314. The parts 45, 46, 47 together form a regulating device which provides an adjustable connection between the movable portion of the adjusting device 314 and the rack 321. This regulating device is analogous to a conventional turnbuckle.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. A method of reducing tolerances held by multiple-spindle machine tools wherein the workpieces are transported in indexible spindles past a plurality of stations and are machined by adjustable tools at least at one of said stations, said method comprising the steps of transporting a series of workpieces in a succession of spindles past one station; machining the workpieces in each spindle at said one station; determining the tolerances of the workpieces thus machined in the respective spindle; comparing the thus determined tolerance with a desired tolerance and producing for each spindle a signal indicating deviations between said desired tolerance and the determined tolerance of the workpiece carried by the respective spindle; separately storing the thus produced signal for each spindle; replacing the workpieces with fresh workpieces at a station past said one station; and utilizing the stored signal for the respective spindle for adjustment of tool means at said one station, when the respective spindle with the fresh workpiece reaches said one station so that the fresh workpiece is machined to a closer tolerance than the workpiece previously held by the spindle whenever said comparing step reveals a deviation between said desired tolerance and said determined tolerance.

2. A method as defined in claim 1, wherein said last mentioned step is carried out in synchronism with indexing of the spindles.

3. A method as defined in claim 1, wherein the tolerance of the machined workpiece is determined at a second station located past said one station and wherein the workpieces are replaced with fresh workpieces at a third station past said second station, but ahead of said first station.

4. A method as defined in claim 3, wherein said second station immediately follows said one station.

5. In a multi-spindle machine tool, a combination comprising a plurality of work spindles indexible past a plurality of stations including a first station, said spindles being relieved of finished workpieces and receiving fresh workpieces at a station past said first station; adjustable tool means at said first station for machining workpieces in successive spindles; control means including measuring means for determining the tolerance of each successive workpiece after the same has been machined and for producing a signal indicative to which the tolerance of the workpiece in the respective spindle deviates from a desired tolerance; means for separately storing the thus-produced signal for each spindle; and adjusting means operatively connected with said storing means for adjusting said tool means in accordance with the stored signal for the respective spindle when the respective spindle with a fresh workpiece returns to the first station so that the fresh workpiece is machined to a closer tolerance than the workpiece previously held in the respective spindle whenever said measuring means determines that the tolerance of a workpiece deviates from said desired tolerance.

6. A combination as defined in claim 5, further comprising a carrier for said spindles and a rotary indexing member for said carrier, said control means further comprising a logical circuit including a second rotary member, transmission means connecting said rotary member to rotate the second rotary member in synchronism with said first rotary member at one-to-one ratio, an actuating member provided on said second rotary member for each of said spindles and a switch located in the path of movement of each of said actuating members.

7. A combination as defined in claim 6, wherein said rotary members are parallel shafts and said transmission means comprises a chain drive.

8. A combination, as defined in claim 6, wherein said actuating members are angularly spaced with reference to each other so that one thereof actuates the respective switch in response to each indexing movement of said carrier.

9. A combination as defined in claim 5, wherein said control means further comprises a pair of pneumatic signal transmitting devices one of which is arranged to transmit signals to said storing means and the other of which is arranged to transmit signals from said storing means to said adjusting means.

10. A combination as defined in claim 9, wherein said signal transmitting devices are indexible in synchronism with said spindles and flank said signal storing means.

11. A combination as defined in claim 5, further comprising a fixed member provided at said one station, a slide movably supported on said fixed member and supporting said tool means, said adjusting means being secured to said fixed member and having a movable portion arranged to determine the extent of movement of said slide with reference to said fixed member in accordance with signals received from said storing means.

12. A combination as defined in claim 11, wherein said slide comprises an adjustable abutment which is engageable with said movable portion of said adjusting means.

13. A combination as defined in claim 5, further comprising a slide provided at said one station and supporting said tool means, and a feed for moving said slide including a toothed rack and a toother gear meshing with said rack, said adjusting means being fixed to said slide and having a movable portion connected with said rack.

14. A combination as defined in claim 13, further comprising fixed stop means for said movable portion of said adjusting means.

15. A combination as defined in claim 13, further comprising regulating means adjustably connecting said movable portion of said adjusting means with said rack.

16. A combination as defined in claim 15, wherein said regulating means comprises a turnbuckle.

17. A combination as defined in claim 5, wherein said machine tool includes a second station past said first station, said spindles being relieved of finished workpieces and receiving fresh workpieces during travel from said second back to said first station, and that control means being located at said second station for determining the tolerance of each successive workpieces as the respective spindle arrives at said second station.

References Cited

UNITED STATES PATENTS

| 3,010,348 | 11/1961 | Swanson et al. | 82—2.5 |
| 3,293,960 | 12/1966 | Feldwisch | 82—2 |

FOREIGN PATENTS

| 802,206 | 10/1958 | Great Britain. |

JOHN F. CAMPBELL, Primary Examiner

D. C. REILEY, Assistant Examiner

U.S. Cl. X.R.

33—179.5; 82—2.5; 90—13